US006334151B1

(12) United States Patent
Bolam et al.

(10) Patent No.: US 6,334,151 B1
(45) Date of Patent: Dec. 25, 2001

(54) PUBLISH AND SUBSCRIBE DATA PROCESSING APPARATUS, METHOD AND COMPUTER PROGRAM PRODUCT WITH DECLARATION OF A UNIQUE PUBLISHER BROKER

(75) Inventors: Steven William Bolam, Eastleigh; Brian Clive Homewood, Winchester; Andrew Hickson, West Wellow; John Michael Knapman, Eastleigh; David Ware, Romsey, all of (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/288,988

(22) Filed: Apr. 9, 1999

(30) Foreign Application Priority Data

Dec. 23, 1998 (GB) ................................... 9828278

(51) Int. Cl.[7] .......................... G06F 15/173; G06F 15/16
(52) U.S. Cl. .......................... 709/225; 709/244; 709/206
(58) Field of Search .......................... 706/62; 709/224, 709/206, 226, 252, 225, 244; 707/6, 1, 10; 345/330, 331, 332

(56) References Cited

U.S. PATENT DOCUMENTS

| 4,815,030 |   | 3/1989  | Cross et al. ........................ 364/900 |
|-----------|---|---------|-----------------------------------------------|
| 5,136,708 | * | 8/1992  | Lapourtre et al. .................. 395/650   |
| 5,675,802 | * | 10/1997 | Allen et al. ....................... 717/3    |
| 5,768,528 | * | 6/1998  | Stumm ............................... 709/231  |
| 5,867,709 | * | 2/1999  | Klencke ............................. 717/2    |
| 5,867,799 | * | 2/1999  | Lang et al. .......................... 707/1   |
| 5,983,214 | * | 11/1999 | Lang et al. .......................... 707/1   |
| 5,987,460 | * | 11/1999 | Niwa et al. .......................... 707/6   |
| 5,999,975 | * | 12/1999 | Kittaka et al. ...................... 709/224  |
| 6,014,654 | * | 1/2000  | Ariyoshi ............................. 706/62   |
| 6,021,443 | * | 2/2000  | Bracho et al. ...................... 709/241   |
| 6,154,781 | * | 1/2000  | Bolam et al. ........................ 709/238  |
| 6,202,093 | * | 3/2001  | Bolam et al. ........................ 709/225  |
| 6,240,451 | * | 5/2001  | Campbell et al. .................... 709/224   |

FOREIGN PATENT DOCUMENTS 806731    11/1997  (EP) .

OTHER PUBLICATIONS

Shan, Yen–Ping et al. "A multiple–platform multi–language distributed object–oriented messaging system", ACM Conference on Object Oriented Programming Systems Languages and Applications, pp. 27–29, Oct. 1993.*
Choy, D.M. et al. "Services and architectures for electronic publishing", IEEE Compcon '96, ISBN: 0–8186–7414–8, pp. 291–297, Feb. 1996.*
Cunningham, R.J. et al. "OSM: an Open Service Model for global information brokerage and distribution", IEEE Col. on Intelligent WWW Agents, Mar. 1997, pp. 2/1–2/5.*
Edge: Work–Group Computing Report, v7, p15(1), Oct. 14, 1996, "Internet Access: Intermind Communicator takes Web by storm . . . ".

* cited by examiner

Primary Examiner—Mark H. Rinehart
Assistant Examiner—Jason D. Cardone
(74) Attorney, Agent, or Firm—Edward H. Duffield

(57) ABSTRACT

In a publish/subscribe data processing broker network having a plurality of broker data processing apparatuses each of which has an input for receiving published messages directly from a publisher application and/or receiving subscription data from a subscriber application, a first broker data processing apparatus has: a unit for receiving a data message published on a first topic by a first publisher application; and a unit for forwarding the received published data message to a subscriber application which has requested, by entering subscription data, to receive a message on the first topic; wherein the first broker data processing apparatus sends a declaration to at least one other broker data processing apparatus of said plurality of broker data processing apparatuses declaring that the first broker data processing apparatus is the only broker data processing apparatus that is directly communicating with a publisher application that is publishing on the first topic.

7 Claims, 2 Drawing Sheets

PUBLISH AND SUBSCRIBE DATA PROCESSING APPARATUS, METHOD AND COMPUTER PROGRAM PRODUCT WITH DECLARATION OF A UNIQUE PUBLISHER BROKER

FIELD OF THE INVENTION

The present invention relates to the field of data processing and more specifically to data processing which distributes messages from suppliers (called, hereinafter, "publishers") of data messages to consumers (called, hereinafter "subscribers") of such messages.

BACKGROUND OF THE INVENTION

Publish/subscribe data processing systems have become very popular in recent years as a way of distributing data messages from publishing computers to subscribing computers. The increasing popularity of the Internet, which has connected a wide variety of computers all over the world, has helped to make such publish/subscribe systems even more popular. Using the Internet, a World Wide Web browser application (the term "application" or "process" refers to a software program, or portion thereof, running on a computer) can be used in conjunction with the publisher or subscriber in order to graphically display messages. Such systems are especially useful where data supplied by a publisher is constantly changing and a large number of subscribers needs to be quickly updated with the latest data. Perhaps the best example of where this is useful is in the distribution of stock market data.

In such systems, publisher applications of data messages do not need to know the identity or location of the subscriber applications which will receive the messages. The publishers need only connect to a publish/subscribe distribution agent process (the terms "distribution agent" and "broker" are used interchangeably herein), which is included in a group of such processes making up a broker network, and send messages to the distribution agent process, specifying the subject of the message to the distribution agent process. The distribution agent process then distributes the published messages to subscriber applications which have previously indicated to the broker network that they would like to receive data messages on particular subjects. Thus, the subscribers also do not need to know the identity or location of the publishers. The subscribers need only connect to a distribution agent process.

One such publish/subscribe system which is currently in use, and which has been developed by the Transarc Corp. (a wholly owned subsidiary of the assignee of the present patent application, IBM Corp.) is shown in FIG. 1. Publishers 11 and 12 connect to the publish/subscribe broker network 2 and send published messages to broker network 2 which distributes the messages to subscribers 31, 32, 33, 34. Publishers 11 and 12, which are data processing applications which output data messages, connect to broker network 2 using the well known interapplication data connection protocol known as remote procedure call (or RPC). Each publisher application could be running on a separate machine, alternatively, a single machine could be running a plurality of publisher applications. The broker network 2 is made up of a plurality of distribution agents (21 through 27) which are connected in a hierarchical fashion which will be described below as a "tree structure". These distribution agents, each of which could be running on a separate machine, are data processing applications which distribute data messages through the broker network 2 from publishers to subscribers. Subscriber applications 31, 32, 33 and 34 connect to the broker network 2 via RPC in order to receive published messages.

Publishers 11 and 12 first connect via RPC directly to a root distribution agent 21 which in turn connects via RPC to second level distribution agents 22 and 23 which in turn connect via RPC to third level distribution agents 24, 25, 26 and 27 (also known as "leaf distribution agents" since they are the final distribution agents in the tree structure). Each distribution agent could be running on its own machine, or alternatively, groups of distribution agents could be running on the same machine. The leaf distribution agents connect via RPC to subscriber applications 31 through 34, each of which could be running on its own machine.

In order to allow the broker network 2 to determine which published messages should be sent to which subscribers, publishers provide the root distribution agent 21 with the name of a distribution stream for each published message. A distribution stream (called hereinafter a "stream") is an ordered sequence of messages having a name (e.g., "stock" for a stream of stock market quotes) to distinguish the stream from other streams. Likewise, subscribers provide the leaf distribution agents 31 through 34 with the name of the streams to which they would like to subscribe. In this way, the broker network 2 keeps track of which subscribers are interested in which streams so that when publishers publish messages to such streams, the messages can be distributed to the corresponding subscribers. Subscribers are also allowed to provide filter expressions to the broker network in order to limit the messages which will be received on a particular stream (e.g., a subscriber 31 interested in only IBM stock quotes could subscribe to the stream "stock" by making an RPC call to leaf distribution agent 24 and include a filter expression stating that only messages on the "stock" stream relating to IBM stock should be sent to subscriber 31).

The above-described publish/subscribe architecture provides the advantage of central coordination of all published messages, since all publishers must connect to the same broker (the root) in order to publish a message to the broker network. For example, total ordering of published messages throughout the broker network is greatly facilitated, since the root can easily assign sequence numbers to each published message on a stream. However, this architecture also has the disadvantage of publisher inflexibility, since each publisher is constrained to publishing from the single root broker, even when it would be much easier for a publisher to connect to a closer broker.

Accordingly, publish/subscribe software designers are beginning to consider architectures where publishers are allowed to publish messages directly to any broker in the broker network. This clearly has the advantage of removing the above-mentioned constraint on publishers. However, as with any tradeoff, it presents other problems. One of the major problems is that since a publisher can publish from any broker, subscription data (data indicating which subscribers have subscribed to which streams/topics) must be propagated throughout the broker network, as it cannot be determined from where a publisher on a particular topic/stream will publish from. Propagating subscription data throughout the broker network is the only way (besides sending all published messages to every broker) to guarantee that published messages, from wherever they may be published, will make their way to the subscribers who have requested the messages. This requirement imposes a great strain on the broker network, as it not only presents a high data traffic level throughout the network but also the subscription data must be locally stored and maintained with respect to each broker in the broker network.

SUMMARY OF THE INVENTION

According to one aspect, the present invention provides in a publish/subscribe data processing broker network having a plurality of broker data processing apparatuses each of which has an input for receiving published messages directly from a publisher application and/or receiving subscription data from a subscriber application, a first broker data processing apparatus comprising: means for receiving a data message published on a first topic by a first publisher application; and means for forwarding the received published data message to a subscriber application which has requested, by entering subscription data, to receive a message on the first topic; wherein the first broker data processing apparatus sends a declaration to at least one other broker data processing apparatus of said plurality of broker data processing apparatuses declaring that the first broker data processing apparatus is the only broker data processing apparatus that is directly communicating with a publisher application that is publishing on the first topic.

According to a second aspect, the present invention provides a data processing method having method steps corresponding to each element of the data processing apparatus of the first aspect of the invention.

According to a third aspect, the present invention provides a computer readable storage medium having a computer program stored on it which, when executed on a computer, carries out the functionality of data processing method of the second aspect of the invention.

The present invention allows one broker in a network of such brokers, to be declared as the unique source of taking published messages into the network for a particular topic.

Thus, with the present invention, since a publisher application can be declared as the unique source of publications on a stated topic in the network, the problem that existed in the prior art of requiring subscription data to be propagated, maintained and stored by each distribution agent throughout the broker hierarchy no longer exists. Specifically, the problem no longer exists because there is no more uncertainty regarding where a publisher application might publish from. Thus, subscription data need only be propagated to and maintained on distribution agents which are included in a direct path between the unique broker source on the stated topic and a subscriber which has subscribed to that topic.

BRIEF DESCRIPTION OF THE DRAWINGS

The invention will be better understood by referring to the detailed description of the preferred embodiments which will now be described in conjunction with the following drawing figures.

DETAILED DESCRIPTION OF THE PREFERRED EMBODIMENTS

Figure 1:
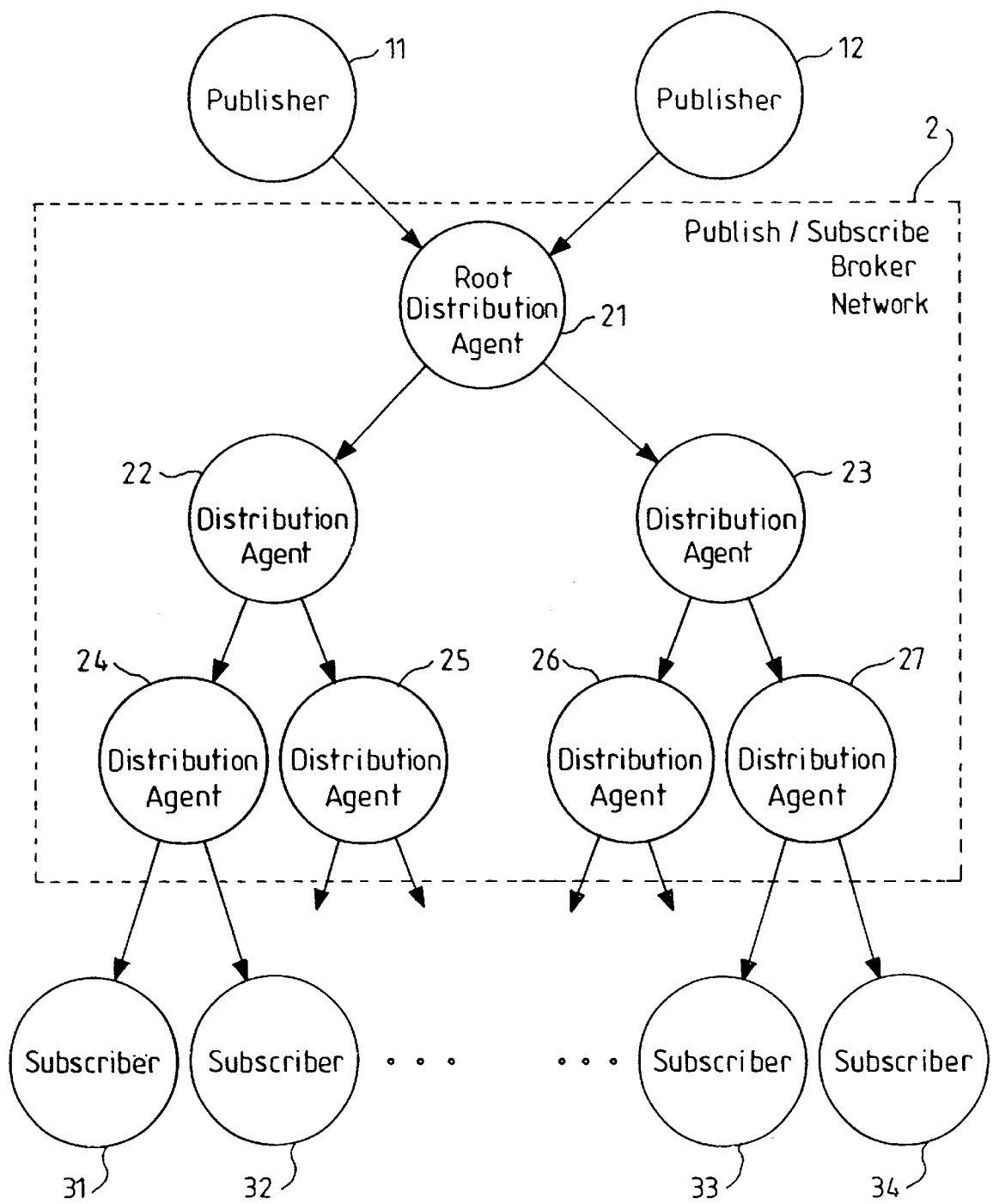
FIG. 1 shows the architecture of a prior art publish/subscribe broker network which was referred to above.

In the prior art FIG. 1 discussed above, a publisher application 11, running on one computer, is, for example, a supplier of live stock market data quotes. That is, publisher application 11 provides frequent messages stating the present value of share prices. In this example, publisher application 11 is publishing messages on a stream called "stock" which has already been configured in the broker network 2. As is well known, when publisher 11 wishes to publish a stock quote message to stream "stock", publisher 11 makes an RPC call to the root distribution agent 11 which is at the top level of the broker network tree structure. In this example, subscriber application 32, running on another computer, has sent a subscription request via an RPC call to leaf distribution agent 24, which is at the bottom level of the tree structure, indicating that subscriber 32 would like to subscribe to stream "stock".

Thus, whenever publisher 11 publishes a data message to stream "stock" the distribution tree structure of broker network 2 channels the message down through the root distribution agent 21, through any intermediary distribution agents (e.g., 22 in the example of FIG. 1) and through the leaf distribution agent 24 to the subscriber 32. This involves a series of RPC calls being made between each successive circle in the diagram of FIG. 1 connecting publisher 11 and subscriber 32 (i.e., 11 to 21, 21 to 22, 22 to 24 and 24 to 32).

Figure 2:
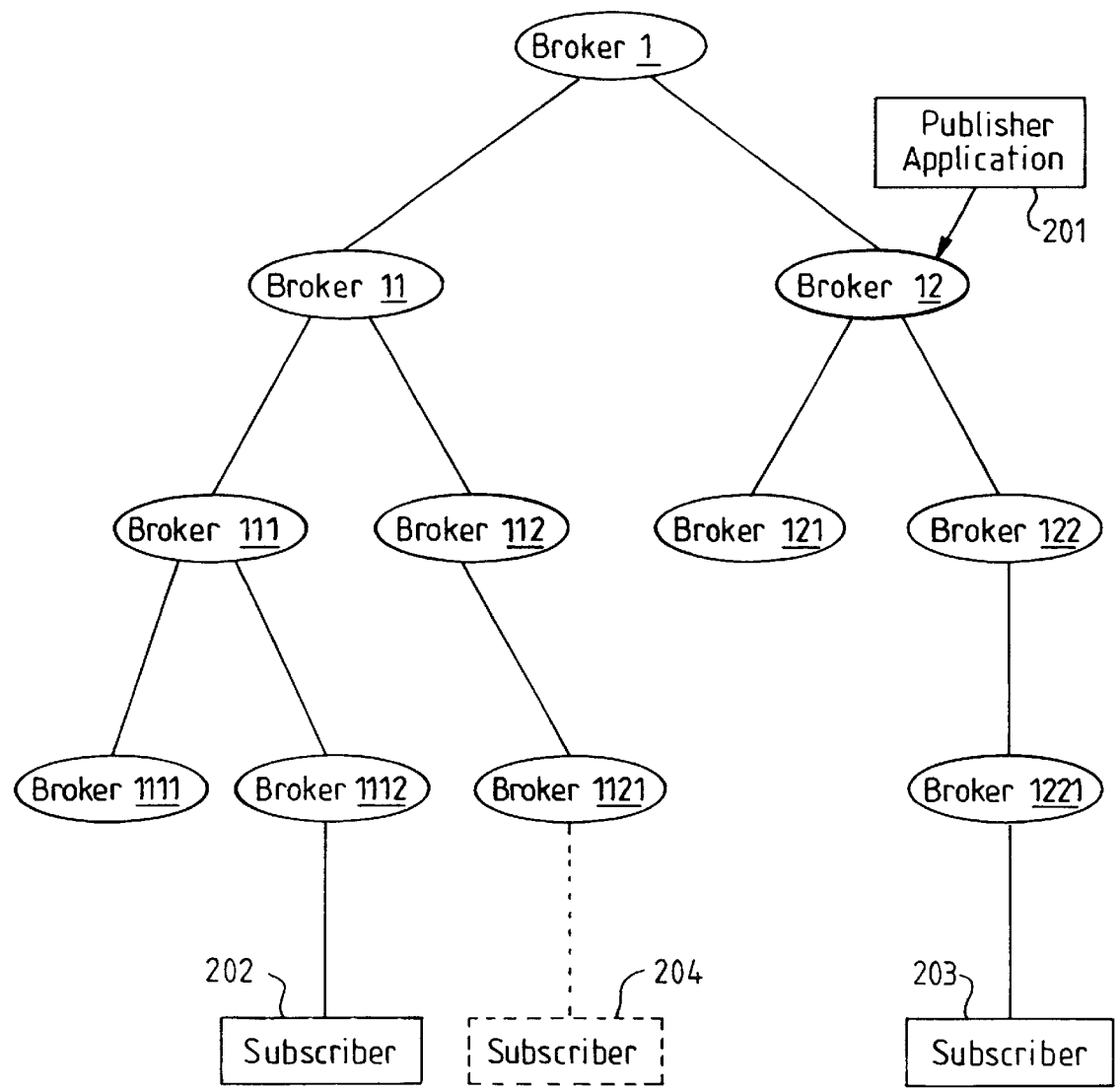
FIG. 2 shows the architecture of a publish/subscribe broker network according to which the preferred embodiment of the present invention will be explained below.

FIG. 2 shows a different publish/subscribe architecture where publisher applications can publish messages to the broker network by directly communicating with any one of a plurality of distribution agents (brokers). For example, publisher application 201 is shown communicating directly with Broker 12. There is no requirement in this architecture that all publisher applications communicate directly with a top (or root) distribution agent. Publisher application 201 can potentially communicate directly with any of the distribution agents shown in FIG. 2, in the described examples below it will be shown communicating directly with Broker 12.

Subscriber applications 202 and 203 would like to receive messages on the stream/topic that publisher application 201 is publishing on. Thus, subscriber applications 202 and 203 communicate directly with Brokers 1112 and 1221, respectively, to provide subscription data thereto informing the broker hierarchy of their desire to receive such published messages. Since the publisher application 201 is allowed to communicate directly with any of a plurality of distribution agents, the subscription data entered by the subscriber applications must be propagated throughout the broker network to each Broker shown in FIG. 2. This way, no matter which distribution agent the publisher application 201 happens to communicate directly with, the published messages will be able to be routed to the subscriber applications 202 and 203. As stated above, however, this creates a high performance overhead due to the excessive amounts of subscription data propagation traffic throughout the broker network and due to the need to have to maintain and store such subscription data locally at each distribution agent.

If a distribution agent (also referred to herein as a "broker") can be identified to the other distribution agents as the home to all publisher applications (e.g. by topic content or a publisher flag) on a given topic, call this a unique publisher broker for simplicity, it is possible to restrict the subscription path in the hierarchy by halting the propagation of the subscription data once this unique publisher broker is reached.

To further the limiting of subscription propagation in the unique publisher broker case it is possible to remove subscriptions that have been propagated down branches of the hierarchy leading off the path between the subscriber and the publisher that contain no subscriptions or the publisher on this topic, thus, reducing the subscriptions for a topic to only lie on the path(s) between the subscriber's (or subscribers') broker(s) and the publisher's broker.

The first level of subscription data propagation restriction prevents subscription data from flowing further once the unique publisher broker is reached by the subscription data. When a subscription for a topic arrives at a unique publisher broker and the topic matches the topic on which this broker is the unique publisher broker, the unique publisher broker will not propagate the subscription any further through the hierarchy as it is known that no other broker can possibly publish on this topic. For example, if a new subscriber application 203 attaches to its nearest Broker 1221 and enters a subscription to a certain topic (e.g., IBM stock price), this subscription data identifying the new subscription will propagate up to Broker 122 and then further up to Broker 12 (which has previously declared itself to the other brokers as the unique publisher broker on the topic of IBM stock price). Broker 12 will then recognize that the subscription data's topic (IBM stock price) matches the topic (IBM stock price) on which Broker 12 is the unique publisher broker, and thus Broker 12 will not further propagate the subscription data to Broker 121 or Broker 1.

The second level of limiting subscription data propagation is the removal of unnecessary subscriptions which has already been propagated to brokers, i.e., those subscriptions that do not lie on the path(s) between subscriber(s) and the unique publisher broker, once a new unique publisher broker is added to an existing broker hierarchy. Any unnecessary subscriptions can be identified by the fact that they would cause publications to flow in the opposite direction from those originating from the unique publisher broker, which is not possible for they would have to have originated from a publisher on another broker, and thus, the publisher broker could not be unique.

The preferred embodiment involves the use of a special message (for example, a publication), call it a unique publisher broker message, this contains the topic concerned and the identity of the broker that has just sent this message. A broker receiving a unique publisher message will follow these rules:

1) If this broker also claims to be a unique publisher broker on this same topic we have a situation where more than one broker in the hierarchy believe they are unique publishers on the same topic, this cannot be valid and an error is reported. Otherwise: The broker marks the topic that matches the one in the message as being a unique publisher topic.
2) If the broker has a subscription from the broker that sent this message, the subscription can be removed. This is because the subscription could only be used if a publication arrived at this broker and was to be propagated towards the broker sending the unique publisher message. This would cause publications to flow towards the publisher which is not possible when the publisher is unique. The identity of the broker sending this message is replaced with the identity of the current broker and the message is then propagated to every relation known to this broker, except the one that originated the unique publisher message.

Now we define the three scenarios that can cause a unique publisher message to be generated by a unique publisher broker and how they are handled:

1) Subscriber applications subscribe to a topic by communicating directly (e.g., via RPC) with one of the brokers, and the subscriptions (i.e., subscription data) are propagated to all brokers before a unique publisher has been identified. When a broker (e.g., Broker 12) declares that it is the unique publisher broker on this topic and subscription(s) already exist, the unique publisher broker (e.g., Broker 12) marks the topic as being unique and a unique publisher message is generated and sent to all relations (meaning, all brokers that are direct neighbours) of this broker (e.g., Brokers 121, 122 and 1). By following the above rules this message will be propagated to all brokers and any redundant subscriptions will be removed from the hierarchy.
2) Before any subscriptions are made, a publisher broker (e.g., broker 12) believes that it is a unique publisher broker on a certain topic (e.g, IBM stock price). A subscription to this topic then arrives at broker 12 from another broker (e.g., broker 1), once a subscriber application 202 has entered a subscription (e.g., by directly communicating the subscription data to broker 1112, which has resulted in corresponding subscription data propagating to brokers 111, 1111, 11, 112, 1121, 1 and finally to broker 12). At this point (when the subscription data reaches broker 12) we halt propagation of the subscription past broker 12, and broker 12 generates a unique publisher message and sends it to the broker 1 that sent the subscription data to broker 12. Again, by following the above rules this unique publisher message will be propagated from broker 1 to all brokers (i.e., 11, 112, 1121, 111, 1112 and 1111) that have received the original subscription data. Then, the subscription data is removed from those brokers (i.e., 112, 1121, 1111) lying off the direct path between the unique publisher broker 12 and the subscriber application 202.
3) A unique publisher broker 12 exists along with subscriber 202 and a direct path (i.e., from subscriber 22 to broker 1112 to broker 111 to broker 11 to broker 1 to broker 12) between them has been formed. Then, a new subscription (from a new subscriber 204, shown in dotted line, is made from a broker 1121 that lies in a branch off a direct path from the unique publisher broker 12 to an existing subscriber 202. When the new subscription data arrives at broker 11 (which is on the direct path mentioned above) and the topic of the subscription has been marked as a unique publisher topic and a subscription to this topic already exists it is now known that we have intercepted a direct path between a publisher and a subscriber. The propagation of the subscription is halted at broker 11 (i.e., the subscription data has already propagated from broker 1121 to broker 112 to broker 11), as a subscription to this topic would already have been propagated from broker 11 to the unique publisher broker 12 due to the existing subscription. A unique publisher message is then generated by broker 11 and sent back to the broker 112 that sent the new subscription. This is the same as the scenario above, only for a sub-tree of the broker hierarchy.

While the preferred embodiment of the invention has been discussed in the context of a broker network made up of a hierarchy (e.g., designed from the top down) of distribution agents, the broker network need not be hierarchical. For example, the network could also be configured as a totally connected network, with each broker connected to every other broker (or some other combination of brokers less than every other broker).

We claim:

1. In a publish/subscribe data processing broker network having a plurality of broker data processing apparatuses each of which has an input for receiving published messages directly from a publisher application and/or receiving subscription data from a subscriber application, a first broker data processing apparatus comprising:

means for receiving a data message published on a first topic by a first publisher application; and means for forwarding the received published data message to a subscriber application which has requested, by entering subscription data, to receive a message on the first topic;

wherein the first broker data processing apparatus sends a declaration to at least one other broker data processing apparatus of said plurality of broker data processing apparatuses declaring that the first broker data processing apparatus is the only broker data processing apparatus that is directly communicating with a publisher application that is publishing on the first topic.

2. The apparatus of claim 1 wherein a second broker data processing apparatus, which is on a direct path between the first broker data processing apparatus and a subscriber application, sends the declaration on behalf of the first broker data processing apparatus upon receiving new subscription data from a new subscriber application to the first topic.

3. The apparatus of claim 1 wherein upon receipt of the declaration subscription data is removed from broker data processing apparatuses that do not lie on a direct path between the first broker data processing apparatus and the subscriber application.

4. The apparatus of claim 1 wherein the network is the Internet.

5. The apparatus of claim 1 wherein at least one of the publisher application and the subscriber application runs in cooperation with a World Wide Web browser application.

6. In a publish/subscribe data processing broker network having a plurality of broker processing apparatuses each of which has an input for receiving published messages directly from a publisher application and/or receiving subscription data from a subscriber application, a method carried out by a first broker data processing apparatus, the method comprising steps of:

receiving a data message published on a first topic by a first publisher application; and forwarding the received published data message to a subscriber application which has requested, by entering subscription data, to receive a message on the first topic;

wherein the first broker data processing apparatus sends a declaration to at least one other broker data processing apparatus of said plurality of broker data processing apparatuses declaring that the first broker data processing apparatus is the only broker data processing apparatus that is directly communicating with a publisher application that is publishing on the first topic.

7. In a publish/subscribe data processing broker network having a plurality of broker data processing apparatuses each of which has an input for receiving published messages directly from a publisher application and/or receiving subscription data from a subscriber application, a computer program product embodied on a computer readable storage medium for, when run on a computer, carrying out a method on a first broker data processing apparatus, the method comprising steps of:

receiving a data message published on a first topic by a first publisher application; and forwarding the received published data message to a subscriber application which has requested, by entering subscription data, to receive a message on the first topic;

wherein the first broker data processing apparatus sends a declaration to at least one other broker data processing apparatus of said plurality of distribution agent data processing apparatuses declaring that the first broker data processing apparatus is the only broker data processing apparatus that is directly communicating with a publisher application that is publishing on the first topic.

* * * * *